Oct. 16, 1945.   O. M. SUMMERS   2,386,989
PRECISION PULL-BAR TESTING APPARATUS
Filed July 5, 1943
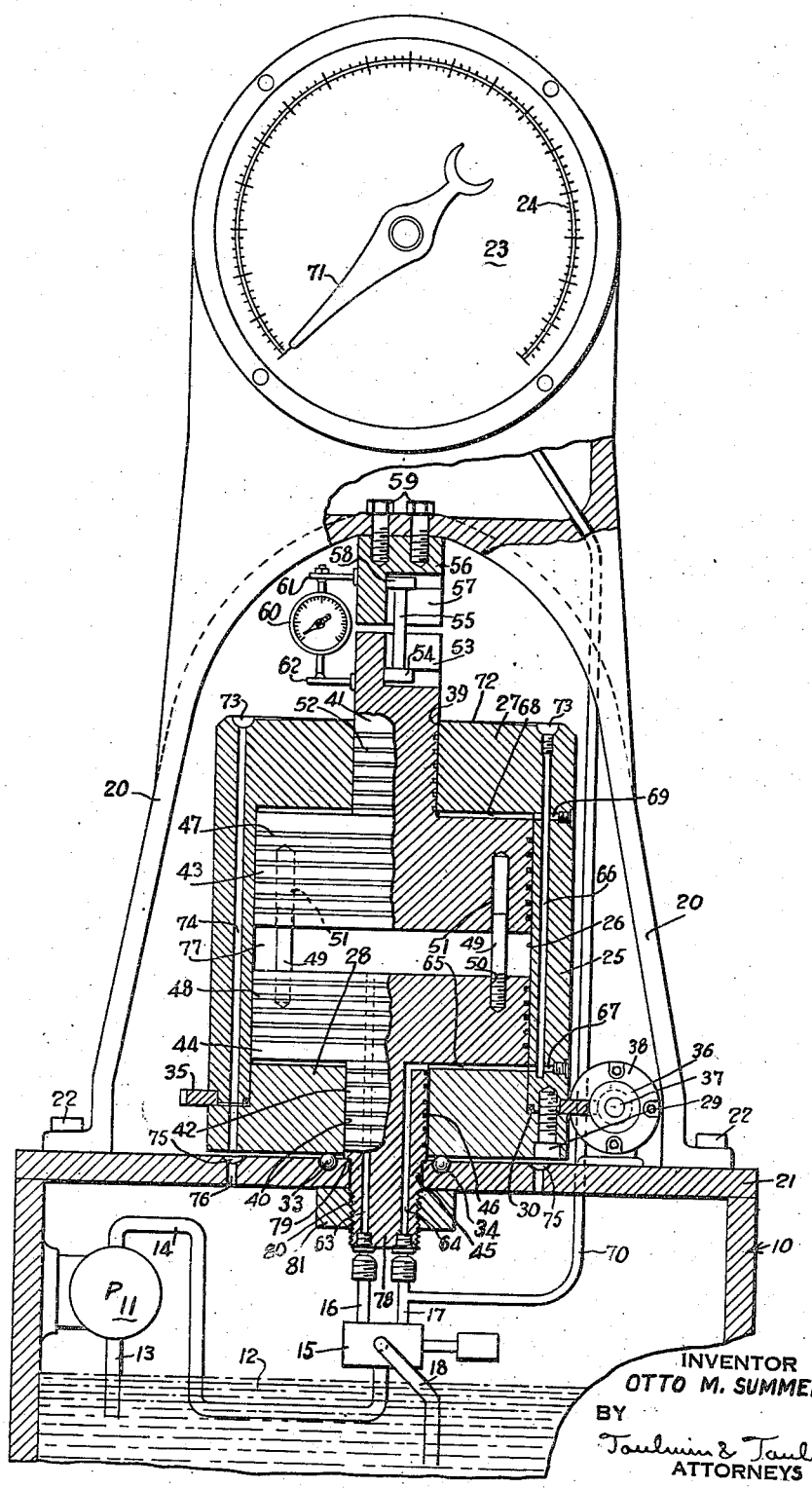
INVENTOR
OTTO M. SUMMERS
BY
Toulmin & Toulmin
ATTORNEYS Patented Oct. 16, 1945

2,386,989

UNITED STATES PATENT OFFICE 2,386,989

PRECISION PULL-BAR TESTING APPARATUS

Otto M. Summers, Mount Gilead, Ohio, assignor to The Hydraulic Development Corp., Inc., Wilmington, Del., a corporation of Delaware Application July 5, 1943, Serial No. 493,506

11 Claims. (Cl. 73—97)

This invention relates to testing machines for determining the tensile strength of materials and also to establish yield and measure the elongation of the material.

An object of the invention is to provide an improved testing machine for determining the tensile strength of materials that will have a high degree of precision.

Another object of the invention is to provide a hydraulically actuated testing machine for determining the tensile strength of materials wherein the hydraulically actuated mechanism for applying tension upon the material to be tested operates with a minimum degree of friction whereby a high degree of precision is obtained.

Another object of the invention is to provide a tensile testing machine of the hydraulically actuated type wherein the tensile strength of the material can be read directly on a suitable indicating gauge that is calibrated in pounds per square inch tensile strength.

Another object of the invention is to provide a hydraulically actuated testing machine for determining the tensile strength of materials wherein a part of the mechanism for obtaining power to apply tension upon the material to be tested is rotated whereby to reduce friction between the elements of the power mechanism and which mechanism is balanced hydraulically in such a manner that the rotating portion of the mechanism may be supported upon friction-free bearings which need carry only the weight of the rotating mechanism.

Further objects and advantages of the invention will become apparent from the drawing and the following description.

In the drawing:

The figure is a vertical cross sectional view of the testing machine of this invention.

The testing machine of this invention consists of a base 10 within which there is positioned a fluid pump 11 that is driven by a suitable electric motor, the pump 11 being adapted to supply fluid under pressure to the testing mechanism hereinafter described. The pump 11 is preferably of the variable delivery type for continuously supplying fluid under pressure to the testing mechanism so that pressure will be increasingly built up in the testing mechanism to gradually apply increasing tension to the material to be tested until the material breaks. The base 10 may also provide a reservoir for containing a body of fluid 12 that is drawn into the pump 11 through the suction line 13 thereof and discharged through the pressure line 14. The pressure line 14 enters a 4-way valve 15 of conventional type that is adapted to deliver fluid under pressure to either of the delivery lines 16 and 17 according to the setting of the 4-way valve, or may deliver fluid to the discharge line 18 which returns the delivery from the pump 11 to the reservoir in conventional manner when the valve 15 is in neutral position.

The testing mechanism consists of a frame 20 that is secured to the top wall 21 of the base 10 by means such as bolts 22. The upper portion of the frame 20 contains a precision gauge 23 that is provided with a calibrated scale 24 that is calibrated directly in pounds per square inch tensile strength so that when a material is to be tested the gauge may be read directly in p. s. i. tensile strength. The gauge 23 may be protected by suitable shock-proof devices to prevent damage to the gauge when the material under test breaks, in any conventional manner.

The mechanism for producing the tension on a test bar that is to be tested consists of a cylinder 25 that is provided with an internal bore 26 and has an end wall 27 integral therewith. The opposite end wall 28 of the cylinder 25 is secured thereto by means of bolts 29, a suitable packing gland 30 being provided between the cylinder 25 and the end wall 28 to prevent leakage of fluid from the internal cylinder bore 26.

The cylinder 25, or the end wall 28 thereof, is supported upon a plurality of balls 33 that are disposed in a race 34 provided in the top wall 21 of the base 10. The cylinder 25 is also provided with a worm gear 35 secured between the bottom wall 28 and the side wall of the cylinder 25 and extends transversely from the cylinder. This worm gear is engaged by a worm 36 carried upon the end of a motor shaft 37 that extends from an electric motor 38 suitably mounted upon the top wall 21 of the base 10.

The end walls 27 and 28 of the cylinder 25 have axial bores 39 and 40, respectively, that receive the shafts 41 and 42, respectively, extending from the pistons 43 and 44 that are positioned within the cylinder bore 26 of the cylinder 25. The shaft 42 is positioned within a bore 45 provided in the top wall 21 of the base 10 that is coaxial with the bearing race 34. Thus, the shaft 42 provides a lower bearing support for the cylinder 25, the bore 40 providing the bearing for the cylinder in the lower wall 28. The shaft 42 is provided with a plurality of annular grooves 46 in order to provide means to receive a lubricating fluid and to reduce the friction between the surface of the shaft 42 and the surface of the bearing bore 40 when the cylinder 25 is rotated upon the shaft 42.

The lower end portion 78 of the shaft 42 is of a reduced diameter whereby a shoulder 79 is provided that rests upon the top surface of the wall 21 to support the shaft 42 and the piston 44. The reduced diameter portion 78 has threads 80 that receive a nut 81 that is forced against the bottom surface of the wall 21 whereby to hold the shaft 42 rigidly in position upon the wall 21.

The pistons 43 and 44 are provided with a plurality of annular balancing grooves 47 and 48, respectively, that are adapted to receive a lubricating fluid and reduce the surface area between the cylinder bore 26 and the surface of the pistons 43 and 44 whereby to maintain friction between these surfaces at a minimum when the cylinder 25 is rotated or when the piston 43 is moved within the cylinder bore 26 in a manner hereinafter described. The piston 44 is provided with a plurality of pins 49 that are threadedly received in threaded openings 50 provided in the top wall of the piston 44. These pins 49 extend upwardly into sliding engagement with the holes 51 provided in the upper piston 43 whereby the upper piston 43 will be held stationary relative to the lower piston 44 when the cylinder 25 rotates. The shaft 41 that extends from the upper piston 43 has a plurality of annular grooves 52 adapted to receive a lubricating fluid and to reduce the surface engagement between the shaft 41 and the surface of the bore 39 whereby to reduce the friction therebetween to a minimum when the cylinder 25 is rotated. The shaft 41 in provided with an inverted T-slot 53 that is adapted to receive a test bar 55 having a head 54 on the lower end thereof to engage T-slot 53. The axial center of the test bar 55 is adapted to align with the axial center of the shaft 41.

A retaining member 56 is provided with a T-slot 57 that is adapted to receive the head 58 on the upper end of the test bar 55. The retaining member 56 is suitably secured to the frame 20 as by means of the bolts 59.

An indicator 60 is carried between the bars 61 and 62 attached to the retaining member 56 and the shaft 41, respectively, whereby to indicate the degree of separation between the retaining member 56 and the shaft 41 when the shaft 41 moves away from the retaining member 56 to thus indicate the elongation of a test bar 55 that is disposed between the shaft 41 and the retaining member 56.

Fluid passages 63 and 64 are provided through the shaft 42 that connect with the fluid pressure lines 16 and 17, respectively. The passage 64 communicates with a space 65 provided between the lower surface of the piston 44 and the bottom wall 28 of the cylinder 25, the piston 44 being always retained in this relative position. A fluid passage 66 is provided in the side wall of the cylinder 25 and communicates with the space 65 by means of a transverse passage 67 and communicates with a space 68 provided between the upper surface of the piston 43 and the top wall 27 of the cylinder 25 by means of a transverse passage 69. The space 68 will always be provided as shown in the drawing when a test bar 55 is initially positioned in the testing machine in order to permit fluid under pressure to be delivered through the line 17, the passage 64, the space 65, the passages 67, 66, 69 and into the space 68. Thus, fluid under pressure will be delivered into the spaces 65 and 68 simultaneously and will be at the same pressure so that the force directed downwardly on the end wall 28 is balanced by an equal force directed upwardly on the top wall 27, the thrust of the force in the space 65 being carried by the shaft 42 while the thrust of the force in the space 68 is carried by the shaft 41. Since the shaft 41 is connected to the test bar 55 the piston 43 will move downwardly to elongate the test bar 55. The fluid pressure developed in the space 65, 68 and their communicating passageways will be connected into the fluid line 70 that is connected to the pressure line 17 and connects to the gauge 23 so that whatever pressure stands in the line 70 will be reflected in the gauge 23 to rotate the indicating hand 71 over the scale 24 whereby the p. s. i. tensile strength of the test bar 55 can be read directly on the gauge 23. Since the velocity of the fluid under pressure through the space 65 into the space 68 is relatively low there will be a negligible pressure drop from the line 17 into the space 68 so that the pressure reading obtained by connecting the line 70 to the line 17 will be substantially that within the space 68 or within practical limits thereof.

The purpose of the annular balancing grooves 46, 48, 47 and 52 in the shafts 42 and 41, and pistons 43 and 44 heretofore described is to maintain an evenly balanced oil film over the entire surface of the piston, their major function being to maintain the piston in the center of the cylinder and have a secondary effect to prevent leakage of fluid from the cylinder. If these balancing grooves are left out the oil film will squeeze out on one side of the pistons 43 and 44 until there is a metal to metal contact between the pistons and the cylinders and the pistons will stick until a high degree of energy is applied to break them loose and get oil between the surfaces. However, any fluid that does seep out of these spaces is returned to the reservoir. The top wall 72 of the cylinder wall 27 is tapered downwardly toward the outer edge thereof so that fluid that reaches the top wall surface 72 will drain into an annular groove 73 that communicates with a passage 74 that extends downwardly through the cylinder 25 and empties onto the top wall 21 of the base 10. The top wall 21 of the base 10 is likewise provided with an annular recess 75 to collect fluid that drains through the passage 74 and any fluid that seeps past the shaft 42 for conducting the same into the reservoir by means of the passages 76.

The fluid passage 63 connecting with the pressure line 16 communicates with a space 77 provided between the pistons 43 and 44 whereby fluid can be conducted into this space 77 for lifting the piston 43 upwardly when a new test bar 55 is to be inserted in the T-slots 53 and 57. When fluid pressure is being supplied through the pressure line 17 the pressure line 16 is connected to the discharge conduit 18 whereby the fluid in the space 77 may return freely to the reservoir and thereby prevent development of any pressure within the space 77.

*Operation*

While the operation of the device as herein disclosed and described will most likely be apparent from the foregoing description, yet it is believed that a résumé of the operation may be desirable to completely understand the operation of the testing machine.

In order to use and operate a testing machine of this invention the pump 11 will be started in operation to deliver fluid, in this case oil, under pressure through the line 14 to the 4-way valve 15. At this time the valve 15 will be in neutral position so that the fluid delivered by the pump 11 will be by-passed through the discharge line 18 back into the reservoir.

In order to place a test bar into a machine the valve 15 will be shifted whereby fluid under pressure will be directed from the line 14 into the line 16 and thus into the space 77 between the pistons 43 and 44 to raise the piston 43 to a position as illustrated in the drawing. A test bar 55 may then be inserted in the T-slots 53 and 57. It will be understood, of course, that the test bar 55 has previously been machined to standard dimensions as is conventional practice when it is desired to determine the tensile strength of a material. The machining of the test bars to standard dimensions is a universal practice and is not a part of this invention so that this conventional and universal practice will not be described herein, but is well-known in the art. The gauge 23 and the indicator 60 will be at zero indication at this time.

With the test bar in position the valve 15 will then be shifted to deliver fluid under pressure from the line 14 into the line 17 and thus deliver fluid under pressure into the spaces 65 and 68. At the same time the space 77 is connected with the discharge conduit 18 to exhaust the space 77. The electric motor 38 will have been previously started whereby the worm 36 is driving the worm gear 35 to rotate the cylinder 25 slowly relative to the pistons 43 and 44. The ball bearings 33 will absorb the downward thrust of the cylinder 25, which is just the weight of the cylinder so that it can rotate freely and very little power is required for its rotation.

With fluid pressure being supplied to the spaces 65 and 68, and with the cylinder 25 rotating, the frictional resistance between the cylinder 25 and the piston 43 is reduced to a minimum so that the piston 43 can move freely downwardly when the pressure increases in the space 68 to pull or elongate the test bar 55. As previously described, the pressure in the spaces 65 and 68 balance the forces on the cylinder 25 so that there is no downward thrust upon the ball bearings 33 due to pressure within the cylinder. This balancing of forces is accomplished by making the surfaces of the pistons 43 and 44 that are exposed to the pressure of equal area. The supply of pressure fluid will be continued to the spaces 65 and 68 until the piston 43 has moved downwardly sufficiently to elongate the test bar 55 to the breaking point. Simultaneous reading of the elongation of test bar and the p. s. i. tensile strength of the bar can be obtained simultaneously by the gauge 23 and the indicator 60.

When the test bar 55 breaks, or whenever sufficient elongation has occurred in the test bar to make a satisfactory determination of the test, the valve 15 will be shifted to neutral and the fluid from the pump 11 will be by-passed from the conduit 18 into the reservoir. Pressure may then be released from the spaces 65 and 68 by shifting the valve 15 so as to interconnect the lines 17 and 18 whereby the spaces 65 and 68 will be exhausted to the reservoir.

While the apparatus disclosed and described herein constitutes a preferred form of the invention, yet it is to be understood that the apparatus is capable of mechanical alteration without departing from the spirit of the invention, and that all such modifications as fall within the scope of the appended claims are intended to be included herein.

Having thus fully described my invention what I claim as new and desire to secure by Letters Patent is:

1. A testing mechanism for determining the tensile strength of materials that consists of, a closed cylinder having axial apertures in the end walls thereof, a pair of opposed pistons in said cylinder including means extending through said apertures in fluid tight relationship for attaching to other apparatus of the testing mechanism, said pistons having equal surface areas facing opposite end walls of said cylinder to balance the axial forces on said cylinder whereby to prevent axial movement of said cylinder relatively to said pistons, means for rotating said cylinder relatively to said pistons, means engaging the extending means on one of said pistons for fixedly mounting the said piston relatively to said cylinder to prevent axial movement thereof with respect to said cylinder, said other piston being movable axially within said cylinder whereby to produce power by said movement when pressure is applied upon said equal surface areas of both of said pistons simultaneously, means for conducting fluid under pressure to between said equal surface areas and the cylinder end walls cooperating therewith concomitantly, and means for exhausting fluid from adjacent the opposite face of said movable piston to thereby permit movement thereof.

2. A testing machine comprising, a closed rotatable cylinder having apertured end walls, means rotatably supporting said cylinder, means for rotating said cylinder, a pair of piston means within said cylinder including shaft means of smaller size than said piston means extending through the apertures in opposite end walls of said cylinder, one of said piston and shaft means being fixedly mounted axially with respect to said cylinder and coaxial with said means for rotatably supporting said cylinder, said other piston and shaft means being reciprocable within said cylinder whereby to transmit power by means of said movement, means for conducting fluid under pressure to between the end walls of said cylinder and said pistons which have equal surface areas thereadjacent to balance the axial forces in said cylinder and substantially eliminate any thrust load of said cylinder upon said means for rotatably supporting the same and to move said reciprocable piston for transmitting power thereby, and means for exhausting fluid from adjacent the opposite face of said movable piston whereby to permit such movement thereof.

3. A testing machine comprising, a closed rotatable cylinder having apertured end walls, means rotatably supporting said cylinder, means for rotating said cylinder, a pair of piston means within said cylinder including shaft means of smaller size than said piston means extending through the apertures in opposite end walls of said cylinder, one of said piston and shaft means being fixedly mounted axially with respect to said cylinder and coaxial with said means for rotatably supporting said cylinder, said other piston and shaft means being reciprocable within said cylinder whereby to transmit power by means of said movement, means for conducting fluid under pressure to between the end walls of said cylinder and said pistons which have equal surface areas thereadjacent to balance the axial forces in said cylinder and substantially eliminate any thrust load of said cylinder upon said means for rotatably supporting the same and to move said reciprocable piston for transmitting power thereby, means for exhausting fluid from adjacent the opposite face of said movable piston whereby to permit such movement thereof, an indicating instrument, and means for transmitting fluid pressure that is applied within said cylinder to said indicating instrument whereby to determine the value of the pressure applied within said cylinder.

4. A testing machine comprising, a closed rotatable cylinder having apertured end walls, means rotatably supporting said cylinder, means for rotating said cylinder, a pair of piston means within said cylinder including shaft means of smaller size than said piston means extending through the apertures in opposite end walls of said cylinder, one of said piston and shaft means being fixedly mounted axially with respect to said cylinder and coaxial with said means for rotatably supporting said cylinder, said other piston and shaft means being reciprocable within said cylinder whereby to transmit power by means of said movement, means for conducting fluid under pressure to between the end walls of said cylinder and said pistons which have equal surface areas thereadjacent to balance the axial forces in said cylinder and substantially eliminate any thrust load of said cylinder upon said means for rotatably supporting the same and to move said reciprocable piston for transmitting power thereby, and valve means in fluid flow communication with said cylinder and the space between said pistons for conducting fluid under pressure to and exhausting fluid from said cylinder and to between said pistons to cause reciprocation of said movable piston.

5. A testing machine comprising, a closed rotatable cylinder having axially apertured end walls, bearing means rotatably supporting said cylinder, means for rotating said cylinder, a pair of piston means positioned within said cylinder and having shaft means of smaller size than the piston extending through said apertures, means fixedly mounting one of said piston and shaft means with respect to said cylinder, said other piston and shaft means being reciprocable within said cylinder, a stationary member associated with said shaft means of said reciprocable piston means, said stationary member and said shaft means of said reciprocable piston means being adapted to receive opposite ends of an article to be tested, means for exhausting fluid from between said piston means, and means for conducting fluid under pressure to between the end walls of said cylinder for application upon opposed equal surfaces of said pistons there adjacent whereby to balance the axial forces in said cylinder and substantially eliminate the thrust load on said bearing means and move said reciprocable piston within said cylinder to apply power upon said article.

6. A testing machine comprising, a closed rotatable cylinder having axially apertured end walls, bearing means rotatably supporting said cylinder, means for rotating said cylinder, a pair of piston means positioned within said cylinder and having shaft means of smaller size than the piston extending through said apertures, means fixedly mounting one of said piston and shaft means with respect to said cylinder, said other piston and shaft means being reciprocable within said cylinder, a stationary member associated with said shaft means of said reciprocable piston means, said stationary member and said shaft means of said reciprocable piston means being adapted to receive opposite ends of an article to be tested, means for exhausting fluid from between said piston means, means for conducting fluid under pressure to between the end walls of said cylinder for application upon opposed equal surfaces of said pistons thereadjacent whereby to balance the axial forces in said cylinder and substantially eliminate the thrust load on said bearing means and move said reciprocable piston within said cylinder to apply power upon said article, an indicating instrument, means for transmitting fluid pressure that is applied upon said pistons to said indicating instrument for indicating the power applied upon said article, and indicating means extending between said stationary member and said shaft of said reciprocable piston to indicate the elongation of the article when power is applied thereto.

7. A testing machine comprising, a closed rotatable cylinder having axially apertured end walls, a piston within said cylinder having shaft means of smaller size than the piston extending through the aperture in an end wall of said cylinder, bearing means rotatably supporting said cylinder, means fixedly supporting said shaft means whereby said cylinder is rotatably journaled upon said piston and said shaft means, means for rotating said cylinder, a second piston within said cylinder reciprocable therein and having shaft means of smaller diameter than the piston extending through the opposite end of said cylinder, stationary means associated with said second shaft means whereby to co-operate therewith to hold an article to be tested therebetween, means for exhausting the space between said pistons, and means for conducting like fluid pressure to between said end walls and equal surface areas on said pistons whereby to produce opposed and balanced forces within said cylinder to prevent development of thrust load upon said bearing means and to move said second piston within said cylinder to apply power upon an article retained between the shaft means associated therewith and the stationary member.

8. A testing machine comprising, a closed rotatable cylinder having axially apertured end walls, a piston within said cylinder having shaft means of smaller size than the piston extending through the aperture in an end wall of said cylinder, bearing means rotatably supporting said cylinder, means fixedly supporting said shaft means whereby said cylinder is rotatably journaled upon said piston and said shaft means, means for rotating said cylinder, a second piston within said cylinder reciprocable therein and having shaft means of smaller diameter than the piston extending through the opposite end of said cylinder, means extending from said fixed piston into engagement with said reciprocable piston to prevent its rotation, stationary means associated with said second shaft means whereby to co-operate therewith to hold an article to be tested therebetween, said pistons having equal surface areas adjacent said end walls, means for exhausting the space between said pistons and means for conducting like fluid pressure to between said pistons and said end walls whereby to produce opposed and balanced forces within said cylinder to prevent development of thrust load upon said bearing means and to move said second piston within said cylinder to apply power upon an article retained between the shaft means associated therewith and the stationary member.

9. A testing machine comprising, a closed rotatable cylinder having axially apertured end walls, a piston within said cylinder having shaft means of smaller size than the piston extending through the aperture in an end wall of said cylinder, bearing means rotatably supporting said cylinder, means fixedly supporting said shaft means whereby said cylinder is rotatably journaled upon said piston and said shaft means, means for rotating said cylinder, a second piston within said cylinder reciprocable therein and having shaft means of smaller diameter than the piston extending through the opposite end of said cylinder, means extending from said fixed piston into engagement with said reciprocable piston to prevent its rotation, stationary means associated with said second shaft means whereby to co-operate therewith to hold an article to be tested therebetween, said pistons having equal surface areas adjacent said end walls, means for exhausting the space between said pistons, means for conducting like fluid pressure to between said pistons and said end walls whereby to produce opposed and balanced forces within said cylinder to prevent development of thrust load upon said bearing means and to move said second piston within said cylinder to apply power upon an article retained between the shaft means associated therewith and the stationary member, and valve means connected to the means for conducting pressure to said cylinder and to the means for exhausting the space between the pistons for relieving pressure between said pistons and said end walls and for conducting fluid under pressure to between said pistons for moving said second piston.

10. A testing machine comprising, a closed rotatable cylinder having axially apertured end walls, a piston within said cylinder having shaft means of smaller size than the piston extending through the aperture in an end wall of said cylinder, bearing means rotatably supporting said cylinder, means fixedly supporting said shaft means whereby said cylinder is rotatably journaled upon said piston and said shaft means, means for rotating said cylinder, a second piston within said cylinder reciprocable therein and having shaft means of smaller diameter than the piston extending through the opposite end of said cylinder, means extending from said fixed piston into engagement with said reciprocable piston to prevent its rotation, stationary means associated with said second shaft means whereby to co-operate therewith to hold an article to be tested therebetween, said pistons having equal surface areas adjacent said end walls, means for exhausting the space between said pistons, means for conducting like fluid pressure to between said pistons and said end walls whereby to produce opposed and balanced forces within said cylinder to prevent development of thrust load upon said bearing means and to move said second piston within said cylinder to apply power upon an article retained between the shaft means associated therewith and the stationary member, valve means connected to the means for conducting pressure to said cylinder and to the means for exhausting the space between the pistons for relieving pressure between said pistons and said end walls and for conducting fluid under pressure to between said pistons for moving said second piston, an indicating means, means for transmitting fluid pressure that is applied between said pistons and said end walls to said indicating means for indicating the power applied upon the article, a second indicating means, and means connecting said second indicating means to said shaft of said second piston and said stationary member whereby to indicate elongation of an article positioned therebetween.

11. A testing machine comprising, a base, a fluid reservoir in said base, a pump for receiving fluid from said reservoir and delivering the same under pressure, a closed rotatable cylinder having axially apertured end walls, bearing means rotatably supporting said cylinder upon said base, means for rotating said cylinder, a piston within said cylinder having shaft means of smaller size than the piston extending through an end wall thereof, means fixedly securing said shaft means to said base whereby said shaft means and said piston provides a bearing surface for said cylinder to support the same for axial rotation, a second piston reciprocable in said cylinder and having shaft means of smaller size than the piston extending through the opposite end wall thereof, said pistons having equal face areas adjacent said end walls, a frame member supported by said base having means to receive one end of an article to be tested and adapted to co-operate with said second shaft means which is adapted to receive the opposite end of the article to be tested, means for exhausting fluid from between said pistons, conduit means for conducting fluid under pressure from said pump into the space between said pistons and said end walls whereby to balance internal forces within said cylinder and apply pressure upon said second piston to move the same within said cylinder to apply force upon an article associated therewith, an indicating means, and means for transmitting fluid pressure applied to said spaces whereby to indicate the force applied by said second piston to an article associated therewith.

OTTO M. SUMMERS.